US008747264B2

(12) United States Patent
Alexander et al.

(10) Patent No.: US 8,747,264 B2
(45) Date of Patent: Jun. 10, 2014

(54) ENERGY HARVESTING SYSTEM FOR A VEHICLE

(71) Applicant: GM Global Technology Operations LLC, Detroit, MI (US)

(72) Inventors: Paul W. Alexander, Ypsilanti, MI (US); Alan L. Browne, Grosse Pointe, MI (US); Nancy L. Johnson, Northville, MI (US); Nilesh D. Mankame, Ann Arbor, MI (US); Xiujie Gao, Troy, MI (US); Geoffrey P. McKnight, Los Angeles, CA (US); Andrew C. Keefe, Encino, CA (US); Peter Maxwell Sarosi, Ferndale, MI (US); Christopher P. Henry, Thousand Oaks, CA (US); Patrick B. Usoro, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/014,778

(22) Filed: Aug. 30, 2013

(65) Prior Publication Data

US 2014/0026555 A1    Jan. 30, 2014

Related U.S. Application Data

(63) Continuation of application No. 12/947,860, filed on Nov. 17, 2010, now abandoned.

(60) Provisional application No. 61/263,306, filed on Nov. 20, 2009.

(51) Int. Cl.
*F02G 5/04* (2006.01)

(52) U.S. Cl.
USPC .............................. 474/202; 60/527

(58) Field of Classification Search
USPC .............................. 474/202, 204, 205; 60/527
See application file for complete search history.

(56) References Cited

U.S. PATENT DOCUMENTS

| 3,303,642 | A | * | 2/1967 | Lee, II | 60/530 |
| 4,010,612 | A | * | 3/1977 | Sandoval | 60/527 |
| 4,027,479 | A | * | 6/1977 | Cory | 60/527 |
| 4,150,544 | A | * | 4/1979 | Pachter | 60/527 |
| 4,246,754 | A | * | 1/1981 | Wayman | 60/527 |
| 4,275,561 | A | * | 6/1981 | Wang | 60/527 |
| 4,996,842 | A | * | 3/1991 | Goldstein | 60/527 |
| 6,002,315 | A | * | 12/1999 | Heiberger et al. | 335/216 |

* cited by examiner

*Primary Examiner* — William E Dondero
*Assistant Examiner* — Diem Tran
(74) *Attorney, Agent, or Firm* — Quinn Law Group, PLLC

(57) ABSTRACT

An energy harvesting system includes a heat engine and a component. The heat engine includes a belt, a first member, and a second member. The belt includes a strip of material and at least one wire at least partially embedded longitudinally in the strip of material. The wire includes a shape memory alloy material. A localized region of the at least one wire is configured to change crystallographic phase between martensite and austenite and either contract or expand longitudinally in response to exposure to a first temperature or a second temperature such that the strip of material corresponding to the localized region also contracts or expands. The first member is operatively connected to the belt and moves with the belt in response to the expansion or contraction of the belt. The component is operatively connected to the first member such that movement of the first member drives the component.

18 Claims, 5 Drawing Sheets

# ENERGY HARVESTING SYSTEM FOR A VEHICLE

CROSS-REFERENCE TO RELATED APPLICATIONS

This application is a continuation application of U.S. patent application Ser. No. 12/947,860, filed on Nov. 17, 2010, which claims the benefit of U.S. Provisional Patent Application Ser. No. 61/263,306, filed on Nov. 20, 2009, the disclosure of which is hereby incorporated by reference.

TECHNICAL FIELD

The present invention generally relates to an energy harvesting system for a vehicle.

BACKGROUND OF THE INVENTION

Vehicles are traditionally powered by engines, which power the vehicle and provide the power to charge a battery of the vehicle. The battery provides power for starting the engine and for operating various vehicle accessories. During operation, the engine produces a large quantity of excess heat, i.e., excess thermal energy that is typically dissipated into the atmosphere and lost. Advancements in technology and desire for driver conveniences have led to additional power loads from the accessory systems. The increased power loads have led to greater demand on the vehicle power sources. In addition, a large portion of the power from the vehicle's power sources is lost as heat.

However, arrangements for extending the fuel economy of a vehicle are desirable in light of the long standing desire for fuel efficient vehicles. Therefore, arrangements that reduce the power load and/or increase the efficiency of the vehicle's traditional power sources, such as the battery and the engine are desirable.

SUMMARY OF THE INVENTION

A belt for a heat engine includes a strip of material and at least one wire. The strip of material extends longitudinally and presents a first side and a second side, opposing the first side. The at least one wire is at least partially embedded in the strip of material and extends longitudinally. The at least one wire includes a shape memory alloy material. A localized region of the at least one wire is configured to change crystallographic phase from martensite to austenite and thereby contract longitudinally in response to exposure to a first temperature such that the strip of material corresponding to the localized region of the at least one wire also contracts. The localized region of the wire is also configured to change crystallographic phase from austenite to martensite and thereby expand longitudinally in response to exposure to a second temperature such that the strip of material corresponding to the localized region of the at least one wire also expands.

A heat engine is configured to be operatively connected to a component. The heat engine includes a belt and a member. The belt is configured to be partially disposed in each of a first fluid region having one of a first temperature and a second temperature and a second fluid region having the other one of the first temperature and the second temperature. The belt includes a strip of material that extends longitudinally and presents a first side and a second side, opposing the first side. At least one wire is at least partially embedded in the strip of material and extends longitudinally. The wire includes a shape memory alloy material. A localized region of the at least one wire is configured to change crystallographic phase from martensite to austenite and thereby contract longitudinally in response to exposure to a first temperature in one of the first fluid region and the second fluid region such that the strip of material corresponding to the localized region of the at least one wire also contracts. The localized region of the wire is also configured to change crystallographic phase from austenite to martensite and thereby expand longitudinally in response to exposure to a second temperature in the other one of the first fluid region and the second fluid region such that the strip of material corresponding to the localized region of the at least one wire also expands. The first member is operatively connected to the belt and is movably connected to the component. The first member is configured to move in response to at least one of the expansion and contraction of the localized region of the belt.

An energy harvesting system for a vehicle includes a heat engine and a component. The heat engine includes a belt, a first member, and a second member. The belt is configured to be partially disposed in each of a first fluid region having one of a first temperature and a second temperature and a second fluid region having the other one of the first temperature and the second temperature. The belt includes a strip of material and at least one wire. The strip of material extends longitudinally and presents a first side and a second side, opposing the first side. The at least one wire is at least partially embedded in the strip of material and extends longitudinally. The wire includes a shape memory alloy material. A localized region of the at least one wire is configured to change crystallographic phase from martensite to austenite and thereby contract longitudinally in response to exposure to a first temperature in one of the first fluid region and the second fluid region such that the strip of material corresponding to the localized region of the at least one wire also contracts. The localized region of the wire is also configured to change crystallographic phase from austenite to martensite and thereby expand longitudinally in response to exposure to a second temperature in the other one of the first fluid region and the second fluid region such that the strip of material corresponding to the localized region of the at least one wire also expands. The first member is operatively connected to the belt. The first member is configured to move with the belt in response to one of the expansion and contraction of the belt. The second member is operatively connected to the belt. The second member is configured to move with the belt in response to the other one of the expansion and contraction of the belt. The component is operatively connected to the first member such that movement of the first member drives the component.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
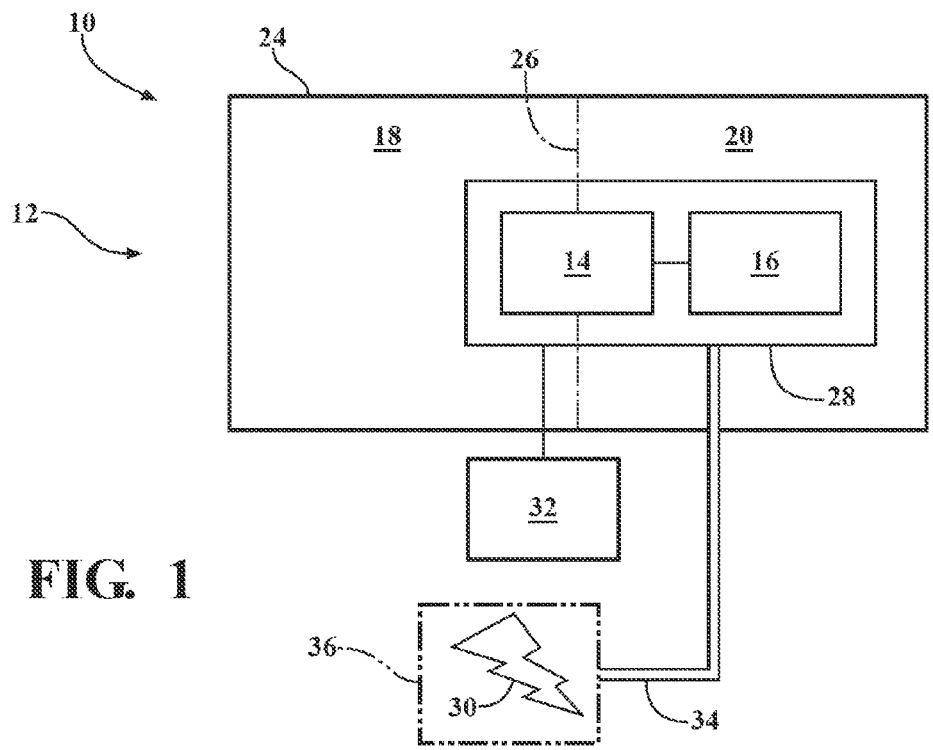
FIG. 1 is a schematic diagram of a vehicle having an energy harvesting system.

Referring to the Figures, wherein like reference numerals refer to like elements, a vehicle is shown generally at 10 in FIG. 1. The vehicle 10 includes an energy harvesting system 12. The energy harvesting system 12 may include a heat engine 14 and a driven component 16.

Figure 2:
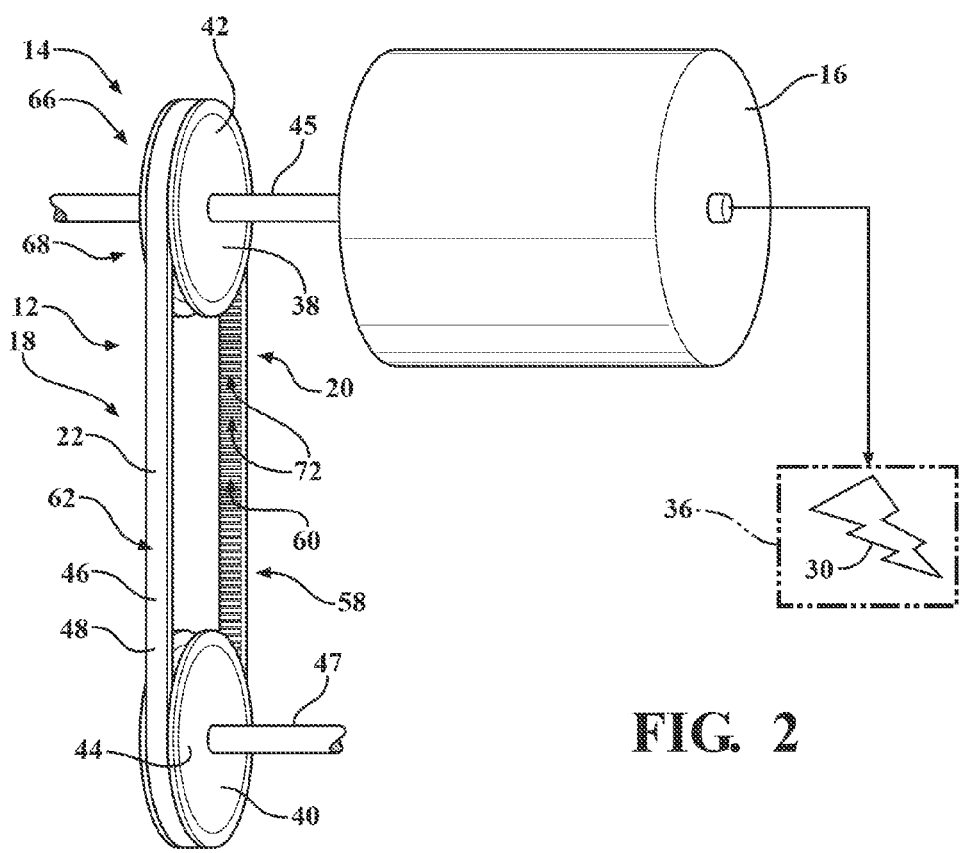
FIG. 2 is a schematic perspective view of an embodiment of the energy harvesting system of FIG. 1, including a heat engine and a component.

Referring to the FIG. 2, the heat engine 14 includes a shape memory alloy material 22 and is operatively disposed in a first fluid region 18 and a second fluid region 20. The heat engine 14 is configured to convert thermal energy, e.g., heat, to mechanical energy and from mechanical energy to electrical energy. More specifically, the energy harvesting system 12 utilizes a temperature differential between the first fluid region 18 and the second fluid region 20 to generate mechanical and/or electrical energy via the shape memory alloy material 22, as explained in more detail below.

Referring again to FIG. 1, the vehicle 10 defines a compartment 24 which may house power and drive sources for the vehicle 10, i.e., an engine and transmission (not shown), which generate heat. The compartment 24 may or may not be enclosed from the surrounding environment, and may include one or more regions and components such as an exhaust pipe, a catalytic converter, shock absorbers, brakes, and any other region where energy is dissipated, such as in a passenger compartment or a battery compartment, i.e., in an electric vehicle.

The energy harvesting system 12 is located at least partially within the compartment 24. The compartment 24 includes the first fluid region 18, having a first temperature, and the second fluid region 20, having a second temperature, different from the first temperature. The first temperature may be greater than the second temperature or vice versa.

The first fluid region 18 and the second fluid region 20 may be spaced from one another, or be separated by a sufficient heat exchange barrier 26, such as a heat shield, a Peltier device, and the like. The heat exchange barrier 26 may be employed to separate the compartment 24 into the first fluid region 18 and the second fluid region 20 such that a desired temperature differential between the first fluid region 18 and the second fluid region 20 is achieved. Fluid within the first fluid region 18 and the second fluid region 20 of the energy harvesting system 12 may be gas, liquid, or combinations thereof. When the heat exchange barrier 26 disposed between the first and second fluid regions 18, 20 is a Peltier device, the heat exchange barrier 26 is configured to generate heat on one side of the barrier 26 and to cool on an opposing side of the barrier 26. The first and second fluid regions 18, 20 may be fluidly connected to a pair of cylinder heads (not shown) that capture the energy given off from the respective fluid region 18, 20. A pump may be disposed in fluid communication with at least one of the first and second fluid regions 18, 20 and the cylinder heads to circulate and move the fluid. The energy harvesting system 12 may be configured to utilize temperature differentials between the first and second fluid regions 18, 20 in the vehicle 10 in areas such as, proximate a catalytic converter, a vehicle battery, a transmission, brakes, suspension components, i.e., a shock absorber, and/or a heat exchanger, i.e., a radiator. Additionally, the energy harvesting system 12 may be configured to utilize temperature differentials between the first and second fluid regions 18, 20 in the vehicle 10 within a battery compartment 24 for an electric vehicle or within the heat exchanger. It should be appreciated that the energy harvesting system 12 may be configured to utilize temperature differentials in other areas of the vehicle, as known to those skilled in the art. One skilled in the art would be able to determine areas having an associated temperature differential and an appropriate position for the heat engine 14 of the energy harvesting system 12 to take advantage of the temperature differentials.

The compartment 24 may be an engine compartment, where fluid within the first fluid region 18 and the second fluid region 20 is air. However, it should be appreciated that other fluids, as known to those skilled in the art, may also be used within the compartment 24. Further, the heat engine 14 and the component 16 may be surrounded by a vented housing 28. The housing 28 may define cavities (not shown) through which electronic components, such as wires may pass.

Referring to FIG. 2, the shape memory alloy material 22 is disposed in thermal contact, or heat exchange relationship, with each of the first and second fluid regions 18, 20. The shape memory alloy material 22 of the heat engine 14 has a crystallographic phase changeable between austenite and martensite in response to exposure to the first and second temperatures of the first and second fluid regions 18, 20. As used herein, the terminology "shape memory alloy" (SMA) refers to alloys which exhibit a shape memory effect. That is, the shape memory alloy material 22 may undergo a solid state phase change via molecular rearrangement to shift between a martensite phase, i.e., "martensite", and an austenite phase, i.e., "austenite". Stated differently, the shape memory alloy material 22 may undergo a displacive transformation rather than a diffusional transformation to shift between martensite and austenite. A displacive transformation is when a structural change occurs by the coordinated movement of atoms (or groups of atoms) relative to their neighbors. In general, the martensite phase refers to the comparatively lower-temperature phase and is often more deformable than the comparatively higher-temperature austenite phase. The temperature at which the shape memory alloy material 22 begins to change from the austenite phase to the martensite phase is known as the martensite start temperature, $M_s$. The temperature at which the shape memory alloy material 22 completes the change from the austenite phase to the martensite phase is known as the martensite finish temperature, $M_f$. Similarly, as the shape memory alloy material 22 is heated, the temperature at which the shape memory alloy material 22 begins to change from the martensite phase to the austenite phase is known as the austenite start temperature, $A_s$. The temperature at which the shape memory alloy material 22 completes the change from the martensite phase to the austenite phase is known as the austenite finish temperature, $A_f$.

Therefore, the shape memory alloy material 22 may be characterized by a cold state, i.e., when a temperature of the shape memory alloy material 22 is below the martensite finish temperature $M_f$ of the shape memory alloy material 22. Likewise, the shape memory alloy material 22 may also be characterized by a hot state, i.e., when the temperature of the shape memory alloy material 22 is above the austenite finish temperature $A_f$ of the shape memory alloy material 22.

In operation, shape memory alloy material 22 that is pre-strained or subjected to tensile stress can change dimension upon changing crystallographic phase to thereby convert thermal energy to mechanical energy. That is, the shape memory alloy material 22 may change crystallographic phase from martensite to austenite and thereby dimensionally contract if pseudoplastically pre-strained so as to convert thermal energy to mechanical energy. Conversely, the shape memory alloy material 22 may change crystallographic phase from austenite to martensite and if under stress thereby dimensionally expand so as to also convert thermal energy to mechanical energy.

Pseudoplastically pre-strained refers to stretching the shape memory alloy material 22 while in the martensite phase so that the strain exhibited by the shape memory alloy material 22 under that loading condition is not fully recovered when unloaded, where purely elastic strain would be fully recovered. In the case of shape memory alloy material 22, it is possible to load the material such that the elastic strain limit is surpassed and deformation takes place in the martensitic crystal structure of the material prior to exceeding the true plastic strain limit of the material. Strain of this type, between those two limits, is pseudoplastic strain, called such because upon unloading it appears to have plastically deformed, but when heated to the point that the shape memory alloy material 22 transforms to its austenite phase, that strain can be recovered, returning the shape memory alloy material 22 to the original length observed prior to any load was applied. Shape memory alloy material 22 may be stretched before installation into the heat engine 14, such that a nominal length of the shape memory alloy material 22 includes that recoverable pseudoplastic strain, which provides the motion used for actuating/driving the heat engine 14. Without pre-stretching the shape memory alloy material 22, little deformation would be seen during phase transformation.

The shape memory alloy material 22 may have any suitable composition. In particular, the shape memory alloy material 22 may include an element selected from the group including cobalt, nickel, titanium, indium, manganese, iron, palladium, zinc, copper, silver, gold, cadmium, tin, silicon, platinum, gallium, and combinations thereof. For example, suitable shape memory alloys 22 may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations thereof. The shape memory alloy material 22 can be binary, ternary, or any higher order so long as the shape memory alloy material 22 exhibits a shape memory effect, e.g., a change in shape orientation, damping capacity, and the like. A skilled artisan may select the shape memory alloy material 22 according to desired operating temperatures within the compartment 24 (FIG. 1), as set forth in more detail below. In one specific example, the shape memory alloy material 22 may include nickel and titanium.

Referring again to FIGS. 1 and 2, the driven component 16 of the energy harvesting system 12 may be configured to be driven by the mechanical energy or power generated from the conversion of thermal energy to mechanical energy within the heat engine 14. In particular, the aforementioned dimensional contraction and the dimensional expansion of the shape memory alloy material 22 may drive the component 16. The component 16 may be a simple mechanical device, such as a generator, a fan, a clutch, a blower, a pump, a compressor, and combinations thereof. It should be appreciated that the component 16 is not limited to these devices, as any other device known to those skilled in the art may also be used. The component 16 may be operatively connected to the heat engine 14 such that the component 16 is driven by the heat engine 14. More specifically, the component 16 may be part of an existing system within the vehicle 10 such as a heating or cooling system and the like. The mechanical energy provided by the shape memory alloy material 22, as described above, may drive the component 16 or may provide assistance to other systems of the vehicle 10 in driving the component 16. Driving the component 16 with mechanical energy provided by the heat engine 14 may also allow an associated existing system within the vehicle 10 to be decreased in size and/or capacity or eliminated entirely. For example, the heat engine 14 may be configured to assist in driving a fan for the heating and/or cooling system, allowing a capacity of the main heating and cooling system to be decreased, while providing weight and energy savings. Additionally, the mechanical energy produced by the energy harvesting system 12 may be used to directly drive the component 16 or be stored for later use. Therefore, the energy harvesting system 12 may be configured to provide additional energy to operate the vehicle 10 and reduce the load on a main energy source for driving the vehicle 10. Thus, the energy harvesting system 12 increases the fuel economy and range of the vehicle 10. Also, the energy harvesting system 12 may be configured to operate autonomously such that no input from the vehicle 10 is required.

When the component 16 is a generator, the component/generator 16 may be configured to convert mechanical energy from the heat engine 14 to electricity 30, as shown as 30 in FIGS. 1 and 2. The component/generator 16 may be any suitable device configured to convert mechanical energy to electricity 30. For example, the component/generator 16 may be an electrical generator that converts mechanical energy to electricity 30 using electromagnetic induction. The component/generator 16 may include a rotor (not shown) that rotates with respect to a stator (not shown) to generate electricity 30. The electricity 30 generated by the component/generator 16 may then be used to assist in powering one or more systems within the vehicle 10.

Additionally, referring to FIG. 1, the energy harvesting system 12 may include an electric control unit 32 (ECU) that is configured to control the first and second temperature of the fluid in the first and second fluid regions 18, 20, respectively. The ECU 32 may be operatively connected to the vehicle 10. The ECU 32 may be a computer that electronically communicates with one or more controls and/or sensors of the energy harvesting system 12. For example, the ECU 32 may communicate with temperature sensors within the first and/or second fluid regions 18, 20, a speed regulator of the component 16, fluid flow sensors, and/or meters configured for monitoring electricity 30 generation of the component/generator 16. Additionally, the ECU 32 may be configured to control the harvesting of energy under predetermined conditions of the vehicle 10, e.g., after the vehicle 10 has operated for a sufficient period of time such that a temperature differential between the first fluid region 18 and the second fluid region 20 is at an optimal differential. It should be appreciated that other predetermined conditions of the vehicle 10 may also be used, as known to those skilled in the art. The ECU 32 may also be configured to provide an option to manually override the heat engine 14 and allow the energy harvesting system 12 to be turned off. A clutch (not shown) may also be controlled by the ECU 32 to selectively disengage the heat engine 14 from the component 16.

As also shown in FIG. 1, the energy harvesting system 12 may also include a transfer medium 34 configured to convey electricity 30 from the energy harvesting system 12. In particular, the transfer medium 34 may convey electricity 30 from the component 16. The transfer medium 34 may be, for example, a power line or an electrically-conductive cable. The transfer medium 34 may convey electricity 30 from the component/generator 16 to a storage device 36, e.g., a battery for the vehicle. The storage device 36 may be located proximate to, but separate from, the vehicle 10. Such a storage device 36 may allow the energy harvesting system 12 to be utilized, for example, with a parked vehicle 10. In another example, the energy harvesting system 12 may be configured to take advantage of a temperature differential created by a sun load on a hood for the corresponding compartment 24 and convert the mechanical energy created from the temperature differential into electrical energy 30 to be stored within the storage device 36.

It is to be appreciated that for any of the aforementioned examples, the vehicle 10 and/or the energy harvesting system 12 may include a plurality of heat engines 14 and/or a plurality of component 16. That is, one vehicle 10 may include more than one heat engine 14 and/or component 16. For example, one heat engine 14 may drive more than one components 16. Likewise, the vehicle 10 may be configured to include more than one energy harvesting system 12, where each energy harvesting system 12 includes at least one heat engine 14 and at least one component 16. The use of multiple heat engines 14 may take advantage of multiple regions of temperature differentials throughout the vehicle 10.

Further, the shape memory alloy material 22 may change both modulus and dimension upon changing crystallographic phase to thereby convert thermal energy to mechanical energy. More specifically, the shape memory alloy material 22, if pseudoplastically pre-strained, may dimensionally contract upon changing crystallographic phase from martensite to austenite and may dimensionally expand, if under tensile stress, upon changing crystallographic phase from austenite to martensite to thereby convert thermal energy to mechanical energy. Therefore, when a temperature differential exists between the first temperature of the first fluid region 18 and the second temperature of the second fluid region 20, i.e., when the first fluid region 18 and the second fluid region 20 are not in thermal equilibrium, respective localized regions 66, 68 of the shape memory alloy material 22 disposed within the first and/or second fluid regions 18, 20 may dimensionally respectively expand and contract upon changing crystallographic phase between martensite and austenite.

Referring again to FIG. 2, the shape memory alloy material 22 may be operatively connected to a pair of movable members 38, 40. The resulting dimensional change of the shape memory alloy material 22 may cause the shape memory alloy material 22 to induce movement of one or more of the members 38, 40. The members 38, 40 may be a first wheel 42 and a second wheel 44. However, it should be appreciated that the members 38, 40 are not limited to being wheels 42, 44, as any other member 38, 40 configured to move, as known to those skilled in the art, may also be used. The first wheel 42 is operatively connected to the component 16 via an axle 45. As the first wheel 42 is induced to move or rotate as a result of the dimensional change of the shape memory alloy material 22, rotation of the first wheel 42 drives the component 16 via the axle 45. The second wheel 44 may be similarly operatively connected to another component (not shown) via an axle 47. Although two wheels 42, 44 are shown, it should be appreciated that more or less wheels 42, 44 may be used, as known to those skilled in the art.

Figure 3A:
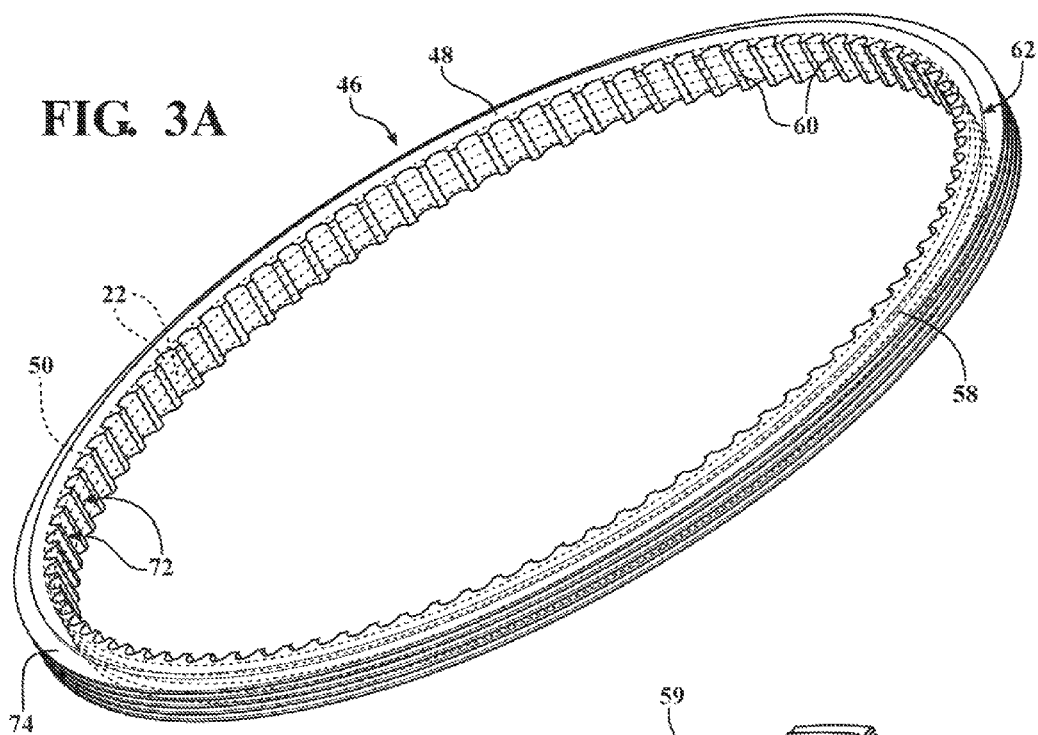
FIG. 3A is a schematic perspective view of a belt of the heat engine of FIG. 2 having a plurality of wires embedded therein and a plurality of fins and defining a plurality of traction grooves.
Figure 3B:
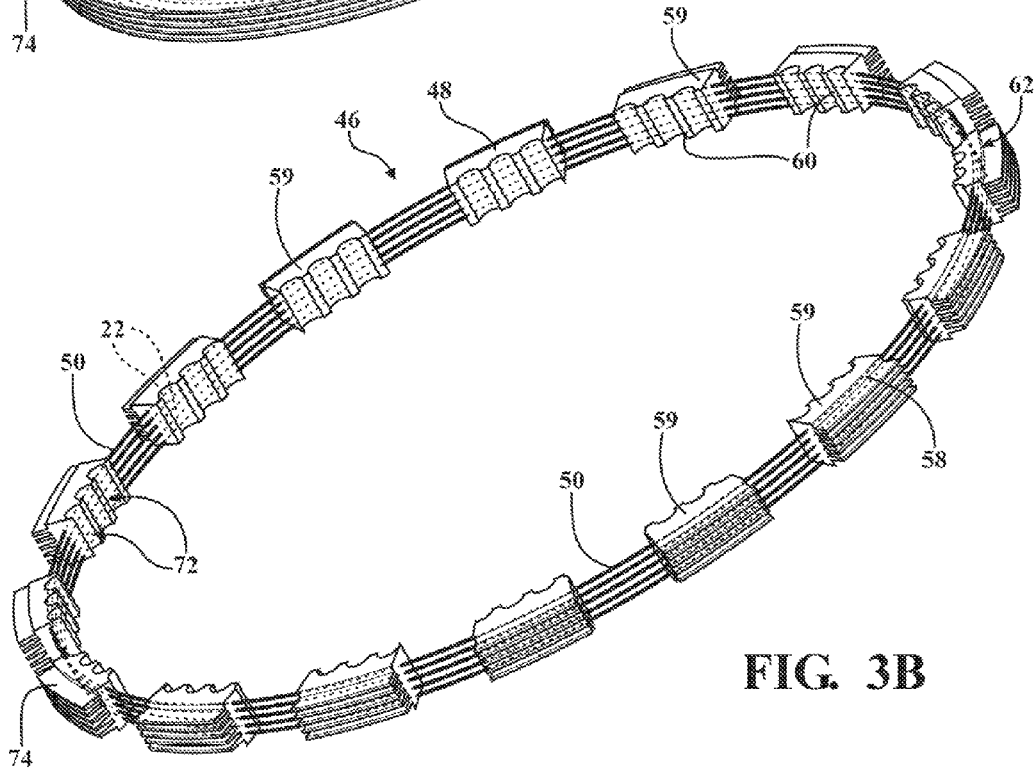
FIG. 3B is a schematic perspective view of another belt of the heat engine of FIG. 2 having a plurality of wires partially embedded therein and a plurality of fins and defining a plurality of traction grooves.
Figure 4:
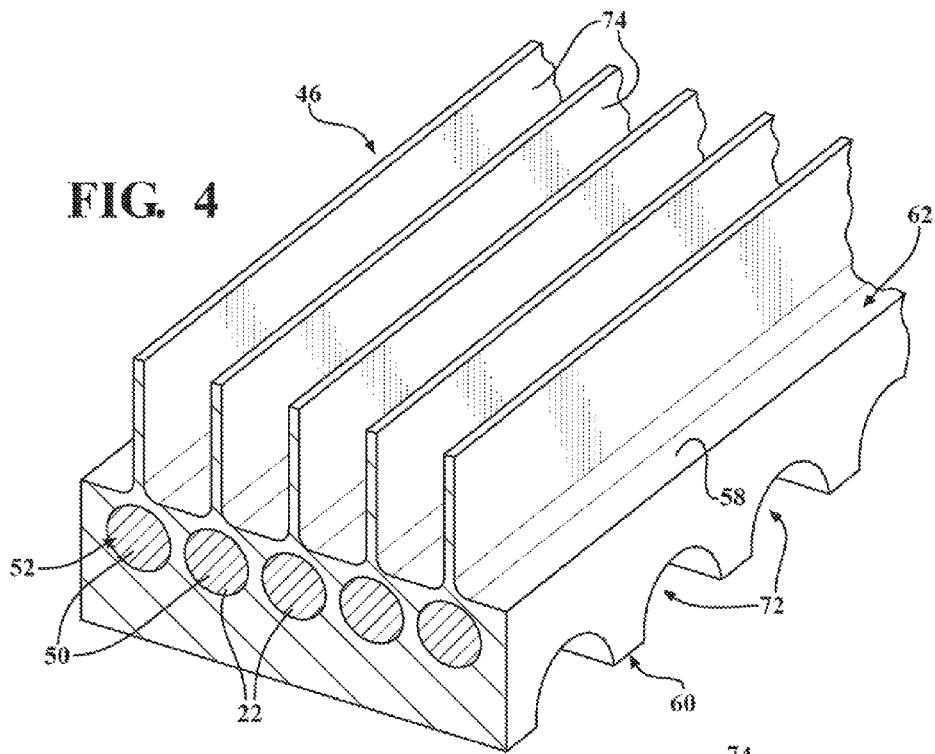
FIG. 4 is a schematic cross-sectional perspective view of the belt of the heat engine of FIG. 2 having a plurality of fins and wires comprising a shape memory alloy material and having a circular cross-section.
Figure 5:
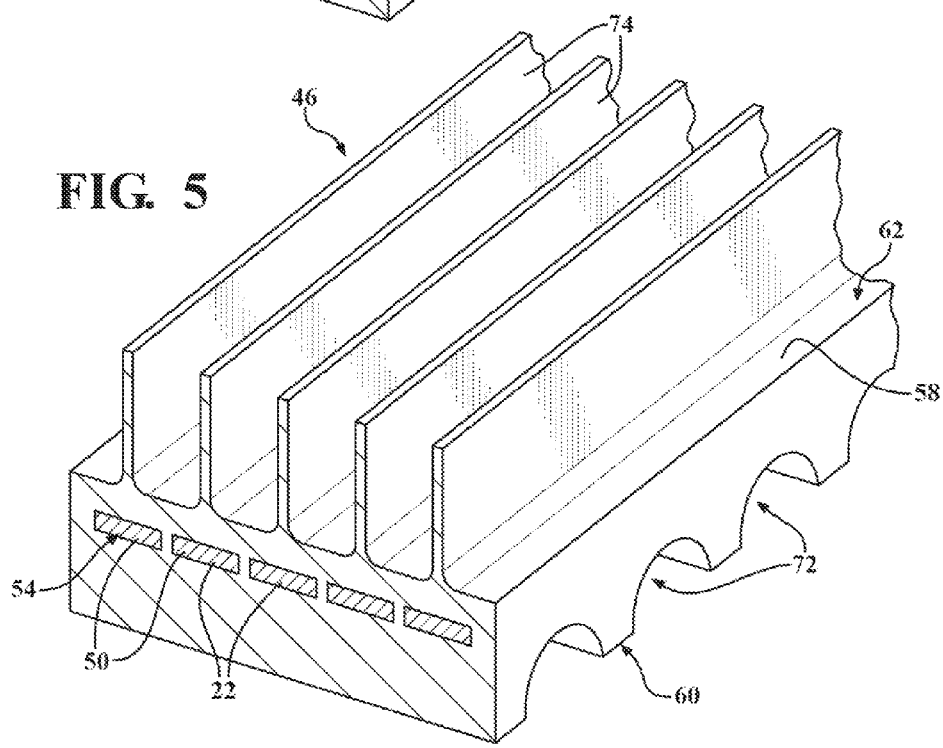
FIG. 5 is a schematic cross-sectional perspective view of another embodiment of the belt of the heat engine of FIG. 2 having wires comprising the shape memory alloy material and having a rectangular cross-section.
Figure 6:
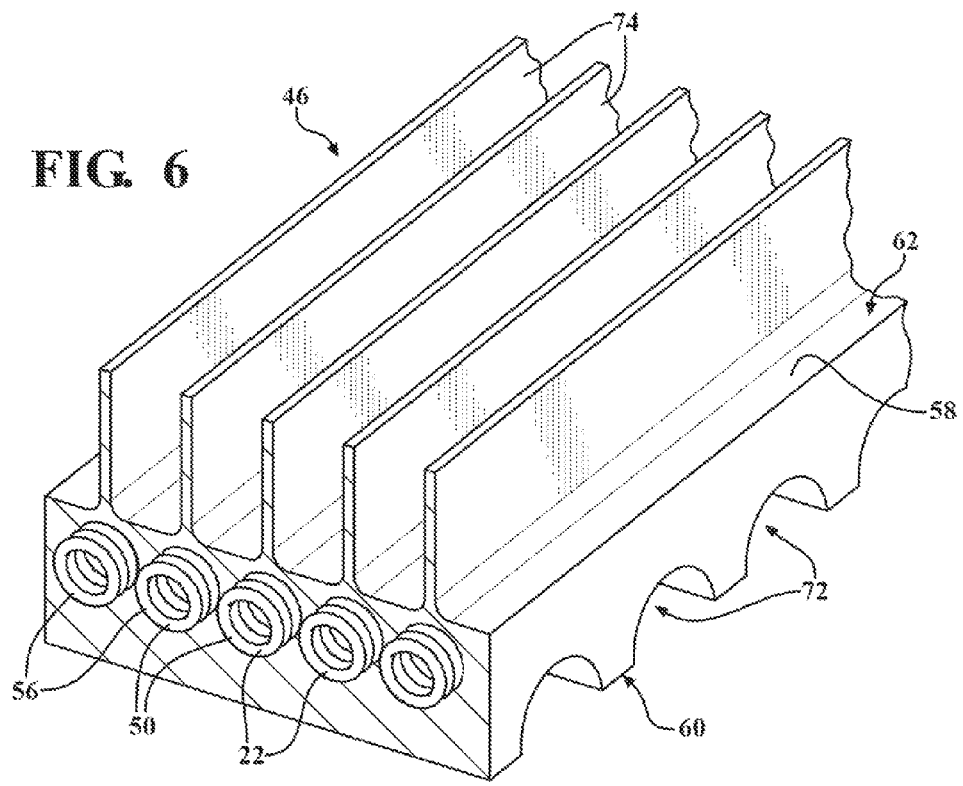
FIG. 6 is a schematic cross-sectional perspective view of yet another embodiment of the belt of the heat engine of FIG. 2 having wires comprising the shape memory alloy material and formed as coils.
Figure 7:
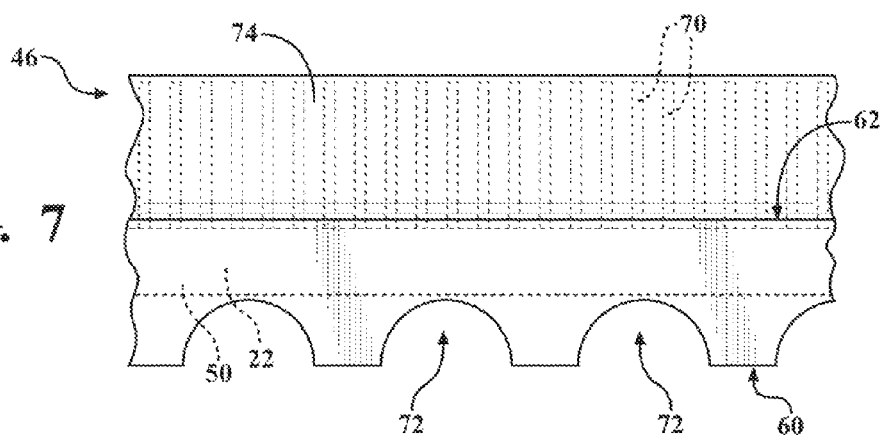
FIG. 7 is a schematic fragmented side view of a section of the belt of FIG. 3 showing elements embedded within the fins.

The shape memory alloy material 22 may be at least partially embedded or encapsulated within a belt 46, as shown in FIGS. 3A and 3B (generally referred to herein as FIG. 3). The belt 46 may be formed as a continuous looped belt 48. The shape memory alloy material 22 may be configured to have any suitable cross-sectional shape. For example, the shape memory alloy material 22 may be formed as at least one elongated strand of wire 50 where each elongated strand of wire 50 has a cross-section that is round, rectangular, octagonal, ribbon, strip, or any other shape known to those skilled in the art. Additionally, the wire 50 may be formed as a braid, cable, and the like. More specifically, referring to FIG. 4, the wire 50 extends longitudinally and has a circular cross-section 52. Referring to FIG. 5, the wire 50 extends longitudinally and has a rectangular cross-section 54. It should be appreciated that that a height and width of the rectangular cross-section 54 may be configured to have any desired aspect ratio. Referring to FIG. 6, the wire 50 extends to provide a longitudinally extending coil 56.

The belt 46, including the embedded shape memory alloy material 22, is configured to convert thermal energy to mechanical energy via any suitable manner. The belt 46 is configured to be operatively attached to one or more of the members 38, 40. For example, the belt 46 may be configured to activate pulleys (not shown), activate wheels (shown at 42 and 44 in FIG. 2), to engage a lever (not shown), to rotate a flywheel (not shown), to engage a screw (not shown), and the like.

The belt 46 includes a strip of material 58 that extends longitudinally and presents a first side 60 and a second side 62, opposing the first side 60, as shown in FIGS. 3A-6. The strip of material 58 is configured to provide structure and traction to the belt 46, including the underlying shape memory alloy material 22. Referring to FIG. 3A, the wire 50 comprising the shape memory alloy material 22 is completely embedded within the belt 46. Referring to FIG. 3B, the wire 50 comprising the shape memory alloy material 22 is partially embedded within the belt 46. More specifically, the strip of material 58 includes a plurality of discrete sections 59 which are disposed in spaced relationship to one another. The wire 50 extends through each of the discrete sections 59 and extends between the sections such that the wire 50 is exposed, i.e., not embedded.

The strip of material 58 may be formed from a resilient material. For example, the resilient material may be an elastomer, a polymer, combinations thereof, and the like. At least one strand of wire 50 which includes the shape memory alloy material 22 is longitudinally embedded within the strip of material 58. Forming the strip of material 58 from a resilient material allows the belt to expand and contract as the localized regions 66, 68 of the associated wire 50 comprising the shape memory alloy material 22 also expand and/or contract. More specifically, referring to FIG. 2, a localized region 66 of the belt 46 may be disposed within the first fluid region 18 such the first temperature causes that corresponding portion of the wire 50 and the associated strip of material 58, to either longitudinally expand or contract as a function of the first temperature of the first fluid region 18. Likewise, another localized region 68 of the belt 46 may be similarly disposed within the second fluid region 20 such that the second temperature causes that corresponding portion of the wire 50, and the associated strip of material 58, to either longitudinally expand or contract as a function of the second temperature of the second fluid region 20. For example, if the first temperature of the first fluid region 18 or the second fluid temperature of the second fluid region 20 is in the cold state, the associated localized region 66 of the wire 50 comprising the shape memory alloy material 22 and the strip of material 58 will longitudinally expand as a result of a phase change of the shape memory alloy material 22 from the austenite phase to the martensite phase. However, if the first temperature of the first fluid region 18 or the second temperature of the second fluid region 20 is in the hot state, the associated localized region 66 of the wire 50 comprising the shape memory alloy material 22 and the strip of material 58 will longitudinally contract as a result of a phase change of the shape memory alloy material 22 from the martensite phase to the austenite phase.

Referring again to FIGS. 2 and 3, the heat engine 14 of the belt 46 of the energy harvesting system 12 forms a continuous loop belt 48 such that the belt 46 operatively interconnects the first member 38, i.e., the first wheel 42, and the second member 40, i.e., the second wheel 44.

The first wheel 42 is operatively connected to the belt 46. The first wheel 42 is configured to be movably connected to the component 16. For example, the first wheel 42 may be operatively connected to the component 16 via a drive shaft or through any other type of interconnection known to those skilled in the art. More specifically, the first wheel 42 may be rotatably connected to the component 16 such that rotation of the first wheel 42 also operates the component 16. The second member 40 may be operatively connected to the belt 46. As described above, the wire 50 and the strip of material 58 are configured to elongate longitudinally in response to exposure to one of a first temperature in the first fluid region 18 and a second temperature in the second fluid region 20. Likewise, the wire 50 and strip of material 58 are configured to contract longitudinally in response to exposure to the other one of a first temperature in the first fluid region 18 and a second temperature in the second fluid region 20. The belt 46 may be looped about each of the first and second wheels 42, 44 such that motion imparted from the belt 46 causes rotation of each of the first wheel and the second wheel. The longitudinal expansion and/or contraction of the localized region 66 of the wire 50 and the corresponding localized region 66 of the strip of material 58 impart motion from the belt 46 to the first member and/or the second member 40 to move or drive the component 16, as explained in more detail below. Accordingly, the belt 46, configured as the continuous looped belt 48, may be configured to continuously move about the first wheel 42 and the second wheel 44 in response to the first and second temperatures such that a plurality of the localized regions 66, 68 of the belt continuously move into and out of the first and second fluid regions 18, 20.

In operation, the first wheel 42 may be immersed in, or configured to be in heat exchange relationship with, the first fluid region 18 while the second wheel 44 may be immersed in, or configured to be in heat exchange relationship with, the second fluid region 20. Alternatively, one or both of the wheels 42, 44 are not immerse in the fluid regions 18, 20.

Referring specifically to FIG. 2, the shape memory alloy material 22 is embedded within the belt 46 that is operatively connected to the first and second wheels 42, 44. By way of a non-limiting example, as one localized region 66 of the shape memory alloy material 22 longitudinally expands when under stress and in contact with one of the first and the second fluid regions 18, 20, another region of the shape memory alloy material 22 that is pseudoplastically pre-strained in contact with the other of the first and the second fluid regions 18, 20 longitudinally contracts. Alternating longitudinal contraction and expansion of the localized regions 66, 68 of the shape memory alloy material 22 of the belt 46, upon exposure to the temperature differential between the first fluid region 18 and the second fluid region 20, may cause the shape memory material 22 to convert potential mechanical energy to kinetic mechanical energy, thereby driving the wheels 42, 44 and converting thermal energy to mechanical energy. As discussed above, the mechanical energy provided to drive the wheels 42, 44 may be used to drive the component 16. When the component 16 is a generator, electricity 30 is generated.

The first temperature is different from the second temperature. Therefore, as stated previously, a temperature differential exists between the first temperature of one of the first and the second fluid region 18, 20 and the second temperature of the other of the first and second fluid region 18, 20. The larger the temperature differential, the quicker the phase change from the austenite phase to the martensite phase and vice versa. A quicker phase change means that the frequency of operation of the belt 46 can be increased, resulting in more work output of the energy harvesting system 12, with respect to time. In the rotating design of the continuous looped belt 48 formed from the shaped-memory material 22, an operational frequency of least 2 Hz may be achieved. The belt 46 may be configured to be lightweight, yet to not only withstand operational loads generated by the shape memory alloy material 22, but also to harsh temperature, vibration, and clogging conditions that may occur during operation of the energy harvesting system 12 and/or the vehicle 10.

The elastomer may be unfilled or filled with elements 70 such as, particles, wire, fibers, combinations thereof, and the like, to increase the thermal conductivity of the belt 46. The wire 50 may extend longitudinally along the strip of material 58 as a single strand of wire 50 or as a plurality of strands of wire 50 that each extend longitudinally in spaced relationship to one another. In one embodiment, the strands of wire 50 extend in generally parallel relationship to one another. Alternatively, when the belt 46 is formed as a continuous looped belt 48, a single strand of wire 50 may extend longitudinally along the strip of material 58 such that the single strand of wire 50 is coiled circumferentially around the continuously looped belt 48 several times. However, it should be appreciated that in the continuous looped belt 48, several strands of wire 50 may extend longitudinally to be individually circumferentially looped about the strip of material 58.

Referring to FIGS. 2-7, a plurality of traction grooves 72 may be defined in the first side 60 of the strip of material 58. The grooves 72 may be of any shape known to those skilled in the art to provide traction to transfer a load through the belt 46 to at least one of members 38, 40. The belt 46 may be a zero slip belt, a grooved gear belt, or any other belt configured to provide traction, as known to those skilled in the art. More specifically, the grooves 72 may extend transversely, in spaced and generally parallel relationship along the first side 60 of the strip of material 58. However, it should be appreciated that the grooves 72 may extend in any desired orientation such that traction between the continuous looped belt 48 and the first member 38 is achieved Referring to the embodiments shown in FIGS. 3-7, a plurality of fins 74 may extend from the second side 62 of the strip of material 58, opposite the grooves 72. The fins 74 may be configured to extend longitudinally along the second side 62 of the strip of material 58 in spaced and parallel relationship to one another. However, it should be appreciated that the fins 74 may be configured to extend from the second side 62 of the strip of material 58 in any orientation, as known to those skilled in the art. By way of a non-limiting example, the fins 74 may extend laterally in spaced an parallel relationship to one another. The fins 74 are configured to dissipate heat from the strand of wire 50 by providing an increased surface area to the belt 46. The wire 50 strand may be embedded within the strip of material 58 and disposed beneath at least one of the fins 74. It should also be appreciated that the fins 74 may be formed to have other shapes and configurations, such as, a plurality of fingers, textures, and the like. In order to increase thermal conductivity of the strip of material 58 to the shape memory alloy material 22 of the wires 50, each of the fins 74 may include at least one element 70. The elements 70 may be disposed within one or more of the fins 74 (FIG. 7) and the corresponding wire 50 is operatively disposed beneath the fin 74 to provide high thermal conductivity to draw heat from the wire 50 and into the fin 74. Metal or carbon (pitch) elements 70 may be used. The carbon fibers may be micro-scale, nano-scale, and the like. It should be appreciated, however, that other types of fibers, known to those skilled in the art, may also be used. Additionally, material 58 may surround or encapsulate the shape memory alloy material 22 to improve heat absorption by providing heat absorption through radiation, in addition to conduction. Additionally, encapsulation of the shape memory alloy material 22 may reduce the cost and improve assembly for multiple wire 50 systems, such as the belt 46, and also protect the shape memory alloy material 22 from abrasion or other damage. However, referring to the embodiment of FIG. 3A, the wire 50 may be partially encapsulated such that sections of the wire 50 extending between the discrete sections 59 of the material 58 are exposed to improve heat transfer on the non-encapsulated sections of the wire 50. By way of a non-limiting example, when the material 58 is formed from a material that negatively impacts the heating and/or cooling rate in the belt 56, the discrete sections 59 of the material 58 still provide structure to keep the belt 56 from slipping on the members 38, 40, while allowing the heat transfer to/from the non-encapsulated sections of the wire 50.

The heat engine 14 and the component/generator 16 may be disposed within the compartment 24 of the vehicle 10. However, it should be appreciated that the heat engine 14 and the component 16 may be disposed in any location within and proximate to the vehicle 10, as long as the shape memory alloy material 22 is disposed in thermal contact or heat exchange relationship with each of the first fluid region 18 and the second fluid region 20.

Figure 8:
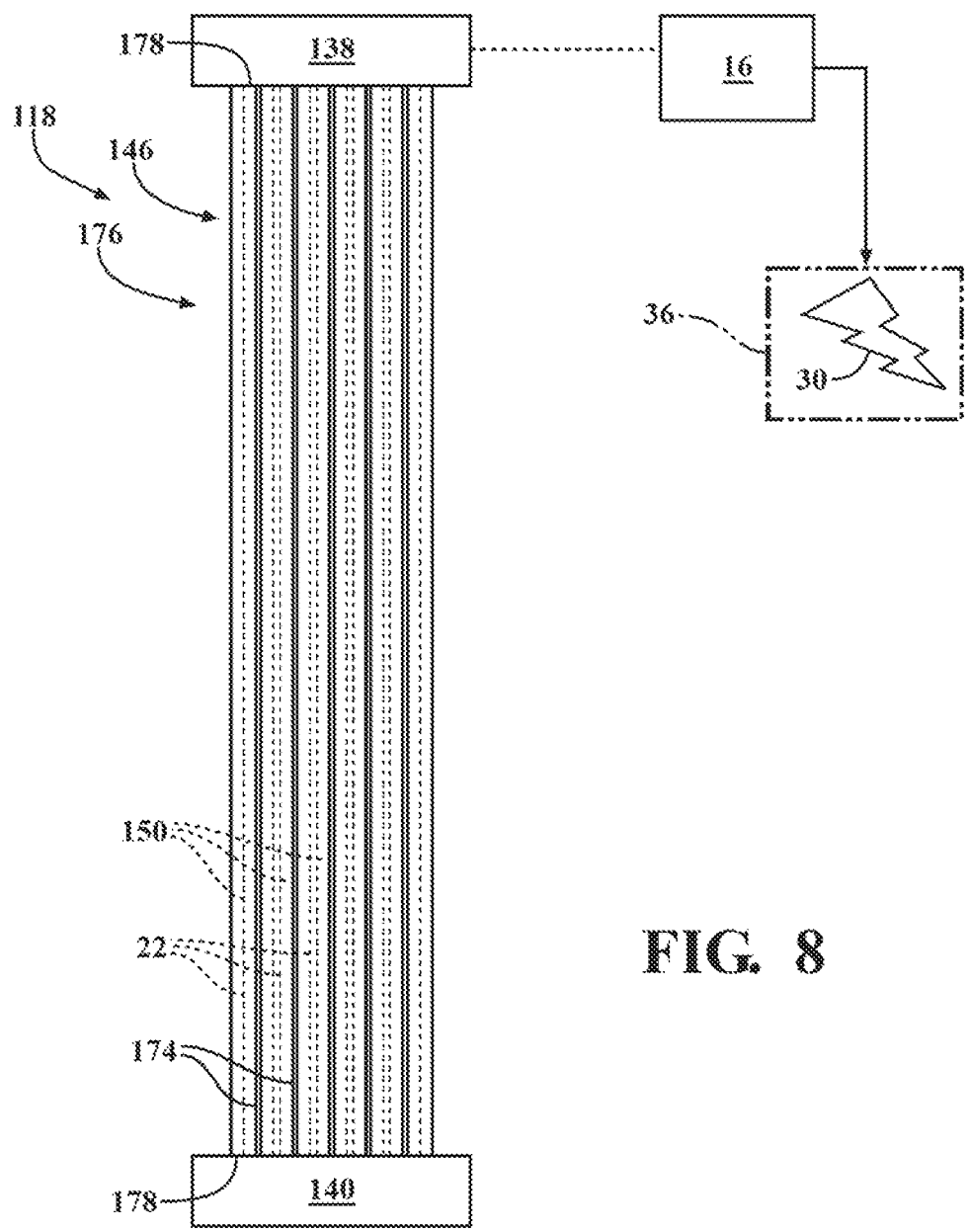
FIG. 8 is a schematic plan view of another embodiment of the energy harvesting system of FIG. 1, including a heat engine including a belt formed as a longitudinal strip and a component.

Referring to FIG. 8, another heat engine 118 is shown. The heat engine 118 includes a belt 146 that is configured as a longitudinal strip 176 that is not looped and extends between a pair of ends 178. The belt 146 includes at least one wire 150 comprising a shape memory alloy material 22. In this embodiment, the longitudinal strip 176 may be configured such that each end 178 of the longitudinal strip 176 is operatively attached to a member 138, 140 such that expansion and/or contraction of the longitudinal strip 176 acts on one or both of the members 138, 140 to drive the component 16. It should be appreciated that the belt 146 may be configured in any other configuration as known to those skilled in the art. The belt 146 may include a one or more fins 174 that are configured to provide high thermal conductivity to draw heat from the wire 150.

While the best modes for carrying out the invention have been described in detail, those familiar with the art to which this invention relates will recognize various alternative designs and embodiments for practicing the invention within the scope of the appended claims.

The invention claimed is:

1. A belt for a heat engine comprising:
 a strip of material including a plurality of discrete sections disposed in spaced relationship to one another and extending longitudinally and presenting a first side and a second side, opposing the first side;
 wherein the strip of material forms a continuous loop;
 at least one wire extending longitudinally between the discrete sections such that the at least one wire is exposed;
 wherein the at least one wire is further defined as extending circumferentially about the continuous loop of the strip of material to form a coil;
 wherein the at least one wire includes a shape memory alloy material;
 wherein a localized region of the at least one wire is configured to change crystallographic phase from martensite to austenite and thereby contract longitudinally in response to exposure to a first temperature such that the strip of material corresponding to the localized region of the at least one wire also contracts; and
 wherein the localized region of the wire is also configured to change crystallographic phase from austenite to martensite and thereby expand longitudinally in response to exposure to a second temperature such that the strip of material corresponding to the localized region of the at least one wire also expands.

2. A belt, as set forth in claim 1, wherein the strip of material is formed from a resilient material.

3. A belt, as set forth in claim 1, wherein the at least one wire is a plurality of wires extending longitudinally.

4. A belt, as set forth in claim 1, wherein the strip of material includes a plurality of filler materials configured to increase thermal conductivity of the strip of material.

5. A belt, as set forth in claim 1, wherein the first side of the strip of material defines a plurality of grooves configured for providing traction between the belt and a movable member.

6. A belt, as set forth in claim 1, further comprising a plurality of fins extending from the second side of the strip of material.

7. A belt, as set forth in claim 6, wherein the plurality of fins extend longitudinally along the second side of the strip of material in spaced and parallel relationship to one another.

8. A belt, as set forth in claim 7, wherein the at least one wire is further defined as being at least one wire extending longitudinally beneath each of the plurality of fins.

9. A belt, as set forth in claim 7, wherein each of the plurality of fins comprises filler material configured to increase thermal conductivity of the strip of material.

10. A belt, as set forth in claim 1, wherein the at least one wire is one of a longitudinal strand of wire having a circular cross-section, a longitudinal strand of wire having a rectangular cross-section, and a longitudinally coiled strand of wire.

11. A belt, as set forth in claim 1, wherein the at least one wire is further defined as at least one wire at least partially embedded in the strip of material and extending longitudinally between the discrete sections such that the at least one wire is exposed between the discrete sections.

12. A heat engine configured to be operatively connected to a component, the heat engine comprising:
 a belt configured to be partially disposed in each of a first fluid region having one of a first temperature and a second temperature and a second fluid region having the other one of the first temperature and the second temperature, the belt including:
a strip of material including a plurality of discrete sections disposed in spaced relationship to one another and extending longitudinally and presenting a first side and a second side, opposing the first side;
a plurality of fins extending longitudinally from the second side of the strip of material;
wherein each of the plurality of fins comprises filler material configured to increase thermal conductivity of the strip of material;
at least one wire extending longitudinally between the discrete sections such that the at least one wire is exposed;
wherein the wire includes a shape memory alloy material;
wherein a localized region of the at least one wire is configured to change crystallographic phase from martensite to austenite and thereby contract longitudinally in response to exposure to the first temperature in one of the first fluid region and the second fluid region such that the strip of material corresponding to the localized region of the at least one wire also contracts; and
wherein the localized region of the wire is also configured to change crystallographic phase from austenite to martensite and thereby expand longitudinally in response to exposure to the second temperature in the other one of the first fluid region and the second fluid region such that the strip of material corresponding to the localized region of the at least one wire also expands;
a first member operatively connected to the belt and movably connected to the component;
wherein the first member is configured to move in response to at least one of the expansion and contraction of the localized region of the belt.

13. A heat engine, as set forth in claim 12, further comprising a second member operatively connected to the belt;
wherein the second member is configured to move in response to at least one of the expansion and contraction of the localized region of the belt.

14. A heat engine, as set forth in claim 12, wherein the strip of material forms a continuous loop;
wherein the at least one wire is further defined as extending circumferentially about the continuous loop of the strip of material; and
wherein the first member is a first wheel and the second member is a second wheel such that the belt is looped about each of the first wheel and the second wheel.

15. A heat engine, as set forth in claim 12, wherein the at least one wire is further defined as at least one wire extending longitudinally beneath each of the plurality of fins.

16. A heat engine, as set forth in claim 12, wherein the at least one wire is one of: at least one of a longitudinal strand of wire having a circular cross-section, at least one of a longitudinal strand of wire having a rectangular cross-section, and at least one of a longitudinally coiled strand of wire.

17. An energy harvesting system for a vehicle, the system comprising:
a heat engine including:
a belt configured to be partially disposed in each of a first fluid region having one of a first temperature and a second temperature and a second fluid region having the other one of the first temperature and the second temperature, the belt including;
a strip of material including a plurality of discrete sections disposed in spaced relationship to one another and extending longitudinally and presenting a first side and a second side, opposing the first side;
a plurality of fins extending from the second side of the strip of material;
wherein each of the plurality of fins extends longitudinally along the second side of the strip of material in spaced and parallel relationship to one another;
at least one wire extending longitudinally between the discrete sections such that the at least one wire is exposed;
wherein the at least one wire includes a shape memory alloy material;
wherein a localized region of the at least one wire is configured to change crystallographic phase from martensite to austenite and thereby contract longitudinally in response to exposure to a first temperature in one of the first fluid region and the second fluid region such that the strip of material corresponding to the localized region of the at least one wire also contracts; and
wherein the localized region of the wire is also configured to change crystallographic phase from austenite to martensite and thereby expand longitudinally in response to exposure to a second temperature in the other one of the first fluid region and the second fluid region such that the strip of material corresponding to the localized region of the at least one wire also expands.

18. An energy harvesting system for a vehicle, as set forth in claim 17, the system further comprising:
a first member operatively connected to the belt;
wherein the first member is configured to moves with the belt in response to one of the expansion and contraction of the belt;
a second member operatively connected to the belt;
wherein the second member is configured to move with the belt in response to the other one of the expansion and contraction of the belt; and
a component operatively connected to the first member such that movement of the first member drives the component.

* * * * *